US012664909B2

(12) United States Patent
Liu et al.

(10) Patent No.: US 12,664,909 B2
(45) Date of Patent: Jun. 23, 2026

(54) METHOD AND APPARATUS FOR DISPLAYING TEACHING VIDEO TASK, DEVICE, STORAGE MEDIUM AND PRODUCT

(71) Applicant: Beijing Zitiao Network Technology Co., Ltd., Beijing (CN)

(72) Inventors: Yan Liu, Beijing (CN); Can Yang, Beijing (CN); Xiaodong Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 498 days.

(21) Appl. No.: 18/187,397

(22) Filed: Mar. 21, 2023

(65) Prior Publication Data
US 2023/0306863 A1 Sep. 28, 2023

(30) Foreign Application Priority Data

Mar. 23, 2022 (CN) ........................ 202210304883.X

(51) Int. Cl.
*G09B 5/06* (2006.01)
*G06F 3/04817* (2022.01)
*G06F 3/0482* (2013.01)

(52) U.S. Cl.
CPC ......... *G09B 5/065* (2013.01); *G06F 3/04817* (2013.01); *G06F 3/0482* (2013.01)

(58) Field of Classification Search
CPC . A63B 24/0003; A63B 69/36; A63B 69/3632; A63B 71/0622; G09B 5/06; G09B 5/065; G06F 3/04812; G06F 3/04817
See application file for complete search history.

(56) References Cited

U.S. PATENT DOCUMENTS 7,237,189 B2 * 6/2007 Altenhofen .............. G09B 7/00
434/350
8,918,819 B1 * 12/2014 Peters ................ H04N 21/2402
725/139

(Continued)

FOREIGN PATENT DOCUMENTS

CN 107195212 A 9/2017
CN 109101161 A 12/2018

(Continued)

OTHER PUBLICATIONS

ISA China National Intellectual Property Administration, International Search Report Issued in Application No. PCT/CN2023/082369, Jun. 12, 2023, WIPO, 8 pages. Submitted with partial English translation.

(Continued)

*Primary Examiner* — Steve Rowland
(74) *Attorney, Agent, or Firm* — Alleman Hall LLP

(57) ABSTRACT

A method and an apparatus for displaying a teaching video task, a device, a storage medium and a product are provided in embodiments of the present disclosure. The method includes: displaying a triggering control corresponding to a teaching video page on a display interface; and in response to a triggering operation by a user on the triggering control, jumping to the teaching video page, where the teaching video page includes at least one teaching video and at least one target task corresponding to the teaching video. In this way, a user can view and trigger a target task associated with the teaching video more intuitively. Before watching a teaching video, the user can learn of at least one target task corresponding to the teaching video, thereby guiding the user to learn the teaching video better.

16 Claims, 11 Drawing Sheets

(56) References Cited

U.S. PATENT DOCUMENTS

| | | | | |
|---|---|---|---|---|
| 11,024,190 | B1 * | 6/2021 | Henchy | G06Q 50/205 |
| 2002/0187462 | A1 * | 12/2002 | Mariappan | G09B 7/00 |
| | | | | 434/350 |
| 2006/0003300 | A1 * | 1/2006 | Davis | A63B 24/0003 |
| | | | | 434/247 |
| 2008/0003553 | A1 * | 1/2008 | Stark | G09B 5/00 |
| | | | | 434/236 |
| 2009/0035733 | A1 | 2/2009 | Meitar et al. | |
| 2009/0263772 | A1 * | 10/2009 | Root | G09B 19/0038 |
| | | | | 434/247 |
| 2010/0028845 | A1 * | 2/2010 | Myer | G09B 7/02 |
| | | | | 434/323 |
| 2012/0064500 | A1 * | 3/2012 | Waitzkin | G09B 5/02 |
| | | | | 434/350 |
| 2012/0233648 | A1 * | 9/2012 | Raman | H04N 21/4622 |
| | | | | 725/93 |
| 2014/0129942 | A1 * | 5/2014 | Rathod | H04N 21/44226 |
| | | | | 715/720 |
| 2014/0272906 | A1 * | 9/2014 | Flannery | G09B 7/06 |
| | | | | 434/362 |
| 2017/0118306 | A1 * | 4/2017 | Madhvanath | H04W 4/029 |
| 2017/0178525 | A1 * | 6/2017 | Kwan | H04L 67/02 |
| 2019/0197912 | A1 | 6/2019 | Burgin et al. | |
| 2020/0302817 | A1 | 9/2020 | Williams et al. | |
| 2020/0351560 | A1 * | 11/2020 | Kiyooka | H04N 21/4784 |
| 2022/0122478 | A1 * | 4/2022 | Yadav | G09B 7/00 |
| 2023/0300403 | A1 * | 9/2023 | Li | H04N 21/4316 |
| | | | | 725/43 |

FOREIGN PATENT DOCUMENTS

| | | | |
|---|---|---|---|
| CN | 109255993 | A | 1/2019 |
| CN | 109389879 | A | 2/2019 |
| CN | 112530220 | A | 3/2021 |
| CN | 112734498 | A | 4/2021 |
| CN | 113115094 | A | 7/2021 |
| CN | 113596521 | A | 11/2021 |
| CN | 113989611 | A | 1/2022 |
| JP | 2021519667 | A | 8/2021 |
| JP | 2022026708 | A | 2/2022 |

OTHER PUBLICATIONS

Japan Patent Office, Office Action Issued in Application No. 2024556504, Sep. 2, 2025, 9 pages.
China National Intellectual Property Administration, Office Action and Search Report Issued in Application No. 202210304883.X, Apr. 1, 2026, 13 pages.
European Patent Office, Extended European Search Report Issued in Application No. 23773760.6, Feb. 27, 2026, Germany, 9 pages.

* cited by examiner

For each target task, determining a playing progress of a target teaching video corresponding to the target task    701

Displaying, according to the playing progress, a state identifier corresponding to the playing progress in the preset area around each target task    702

METHOD AND APPARATUS FOR DISPLAYING TEACHING VIDEO TASK, DEVICE, STORAGE MEDIUM AND PRODUCT

CROSS-REFERENCE TO RELATED APPLICATIONS

This application claims priority to Chinese Patent Application No. 202210304883.X, filed on Mar. 23, 2022, which is hereby incorporated by reference in its entirety.

TECHNICAL FIELD

Embodiments of the present disclosure relate to the technical field of interface interaction, and in particular, to a method and an apparatus for displaying a teaching video task, a device, a storage medium and a product.

BACKGROUND

With development of network and terminal technologies, more and more application software gradually advances into life of users, and provides convenience for the life of the users.

SUMMARY

In a first aspect, an embodiment of the present disclosure provides a method for displaying a teaching video task, including:
- displaying a triggering control corresponding to a teaching video page on a display interface; and
- in response to a triggering operation by a user on the triggering control, jumping to the teaching video page, where the teaching video page includes at least one teaching video and at least one target task corresponding to the teaching video.

In a second aspect, an embodiment of the present disclosure provides an apparatus for displaying a teaching video task, including:
- a displaying module, configured to display a triggering control corresponding to a teaching video page on a display interface; and
- a processing module, configured to jump to the teaching video page in response to a triggering operation by a user on the triggering control, where the teaching video page includes at least one teaching video and at least one target task corresponding to the teaching video.

In a third aspect, an embodiment of the present disclosure provides an electronic device, including: a processor and a memory;
- the memory stores computer executable instructions; and
- the processor executes the computer executable instructions stored in the memory, to cause the processor to execute the method for displaying a teaching video task according to the above first aspect and various possible designs of the first aspect.

In a fourth aspect, an embodiment of the present disclosure provides a computer readable storage medium, where the computer readable storage medium stores computer executable instructions, and when a processor executes the computer executable instructions, the method for displaying a teaching video task according to the above first aspect and various possible designs of the first aspect is implemented.

In a fifth aspect, an embodiment of the present disclosure provides a computer program product, including a computer program, and when the computer program is executed by a processor, the method for displaying a teaching video task according to the above first aspect and various possible designs of the first aspect is implemented.

BRIEF DESCRIPTION OF DRAWINGS

To describe technical solutions in embodiments of the present disclosure or in the prior art more clearly, the following briefly introduces accompanying drawings required for describing the embodiments or the prior art, Apparently, the accompanying drawings in the following description show some embodiments of the present disclosure, and other drawings may also be obtained according to these drawings by persons of ordinary skill in the art without creative efforts.

DESCRIPTION OF EMBODIMENTS

Figure 1:
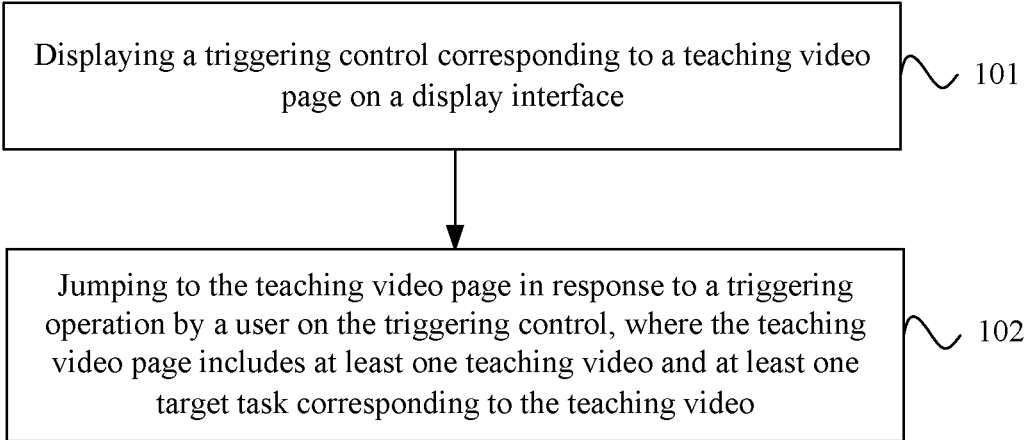
FIG. 1 is a schematic flowchart of a method for displaying a teaching video task according to an embodiment of the present disclosure.

To make objectives, technical solutions, and advantages of embodiments of the present disclosure clearer, the technical solutions in embodiments of the present disclosure will be described below in a clear and comprehensible way with reference to accompanying drawings in the embodiments of the present disclosure. Obviously, the described embodiments are only a part but not all of the embodiments of the present disclosure. Other embodiments obtained by persons of ordinary skill in the art based on the embodiments of the present disclosure without creative efforts shall belong to the protection scope of the present disclosure.

At present, a variety of application software provides online learning functions. Contents of online learning include, but are not limited to, learning how to implement a certain function of application software, learning contents of a book, and the like. For example, by watching a teaching video, a live streamer may learn operations, such as how to do a live stream, how to use props during live streaming, how to perform interaction and the like.

In an existing online learning solution, a user may select on a terminal device a corresponding teaching video to watch according to an actual demand. However, the user may not completely grasp contents in the teaching video by merely watching a video. Therefore, in some existing online learning solutions, the teaching video is bound with a corresponding task, and knowledge in the teaching video is further consolidated by completing the task.

However, in the existing online learning solution, after finishing watching the teaching video, the user usually needs to click to enter a task page, and chooses from a plurality of tasks on the task page a matched task to finish. The operations are cumbersome, leading to poor user experience.

The present disclosure provides a method and an apparatus for displaying a teaching video task, a device, a storage medium, and a product, aiming at the described technical problems of cumbersome operations and low learning efficiency of users in an existing online learning solution.

It should be noted that, the method and the apparatus for displaying a teaching video task, the device, the storage medium, and the product provided by the present disclosure may be applied to various online learning scenarios.

Generally, existing teaching software only includes a teaching video, and a user may hardly grasp knowledge contents in the teaching video after watching the teaching video. In order to improve teaching effects, a corresponding task may be set for each teaching video, and the knowledge contents may be consolidated by completing the corresponding task. However, an existing task generally needs to be actively triggered by the user, and a teaching video and a corresponding task are separately arranged on different display interfaces, so the operations are cumbersome, resulting in poor learning effects.

In the process of solving the described technical problems, the inventor finds through research that, in order to enable a user to understand a task corresponding to a teaching video more intuitively, the teaching video and a target task corresponding to the teaching video can be displayed on a teaching video page. Thus, before watching a teaching video, the user can know at least one target task corresponding to the teaching video, and after finishing learning the teaching video, the user can process the task corresponding to the teaching video, and thus, the user can be guided to learn the teaching video better.

FIG. 1 is a schematic flowchart of a method for displaying a teaching video task according to an embodiment of the present disclosure. As shown in FIG. 1, the method includes the following.

Step 101: displaying a triggering control corresponding to a teaching video page on a di splay interface.

Step 102: jumping to the teaching video page in response to a triggering operation by a user on the triggering control, where the teaching video page includes at least one teaching video and at least one target task corresponding to the teaching video.

In this embodiment, a triggering control corresponding to the teaching video page may be displayed on the display interface, and a user can trigger the triggering control according to an actual demand to enter the teaching video page. Correspondingly, when a triggering operation by the user on the triggering control is detected, the teaching video page may be jumped to. Optionally, at least one teaching video and at least one target task corresponding to the teaching video are displayed on the teaching video page. The triggering operation includes but is not limited to any one of clicking, double clicking, long pressing, dragging and the like.

A practical application is taken as an example, the teaching video is also referred to as a guide video, and may specifically be a video used for teaching a live streamer how to initiate a live stream through application software, how to use props during live streaming, and how to interact with viewers in live streaming. Correspondingly, a target task corresponding to a teaching video may specifically be initiating a live stream, live streaming for a preset duration, and the like. Optionally, the target task corresponding to the teaching video is a task associated with the teaching video, for example, when the teaching video is a video for teaching a live streamer how to initiate a live stream, the target task corresponding to the teaching video may specifically be initiating a live stream.

Optionally, for different application scenarios, the teaching video may also be other videos matching the application scenarios. The present disclosure does not limit the application scenarios of the teaching video herein.

Figure 2:
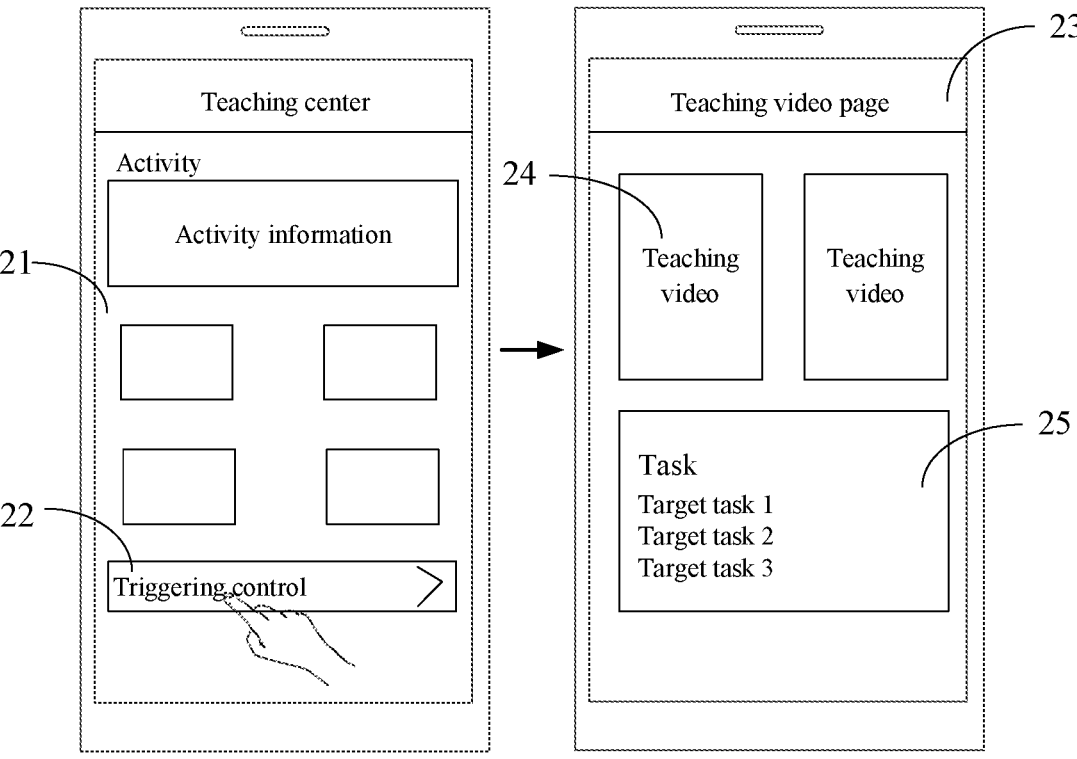
FIG. 2 is a schematic diagram of interface interaction according to an embodiment of the present disclosure.

FIG. 2 is a schematic diagram of interface interaction according to an embodiment of the present disclosure. As shown in FIG. 2, a triggering control 22 may be displayed on a display interface 21, where an identifier corresponding to a teaching video page may be displayed on the triggering control 22. After detecting a triggering operation by a user on the triggering control 22, it is possible to jump to the teaching video page 23. The teaching video page 23 includes at least one teaching video 24 and at least one target task 25 corresponding to the teaching video 24.

In the method for displaying a teaching video task provided by the present embodiment, by displaying a teaching video and simultaneously displaying at least one target task corresponding to the teaching video, a user can view and trigger a target task associated with the teaching video more intuitively. Before watching a teaching video, the user can know at least one target task corresponding to the teaching video, and thus the user can be guided to learn the teaching video better. A triggering process of the target task is simplified, and the user experience is improved.

Further, on the basis of any one of the foregoing embodiments, the teaching video page includes at least one teaching category, where each teaching category includes at least one teaching video;

step 102 includes:

for each teaching category, determining a target presentation video corresponding to the teaching category, and performing differentiated display on the target presentation video and displaying at least one target task corresponding to the target presentation video;

where the differentiated display includes any one of enlarged display and highlighted display.

In this embodiment, since teaching contents corresponding to teaching videos are diversified, in order to facilitate distinguishing between the teaching videos, the teaching videos may be divided into a plurality of teaching categories. Each teaching category corresponds to at least one teaching video respectively.

Further, with regard to the at least one teaching video in each teaching category, any teaching video can be selected to be displayed differentially, so that the teaching video is different from other teaching videos, thereby enabling a user to watch the teaching videos more intuitively. Specifically, for each teaching category, a target presentation video corresponding to the teaching category may be determined, and at least one target task corresponding to the target presentation video is presented. A differentiated display operation is performed on the target presentation video, where the differentiated display includes any one of enlarged display and highlighted display.

Figure 3:
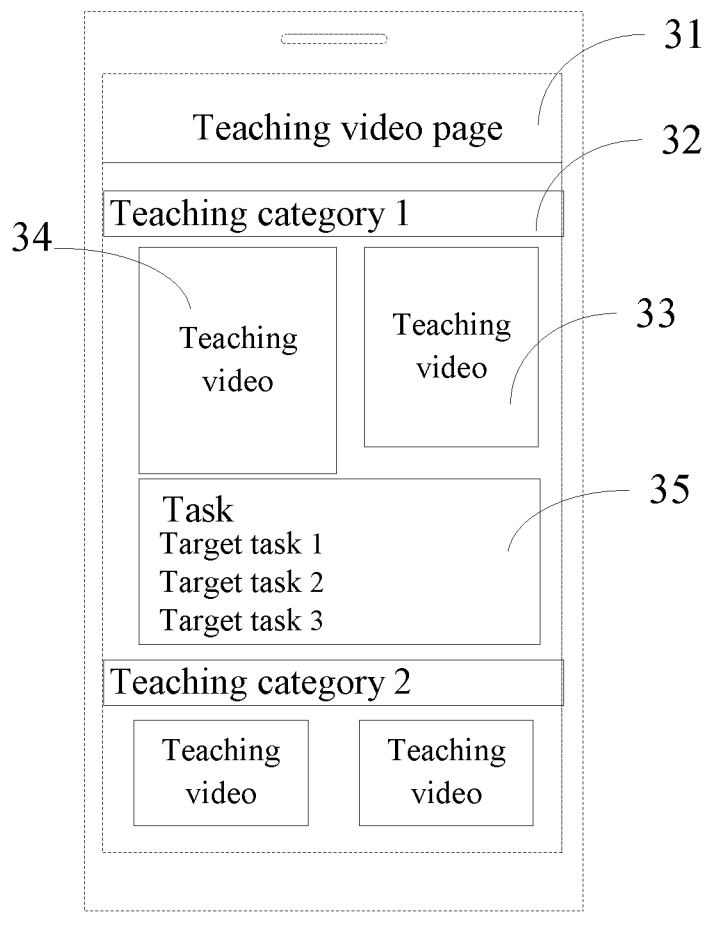
FIG. 3 is a schematic diagram of a display interface according to an embodiment of the present disclosure.

FIG. 3 is a schematic diagram of a display interface according to an embodiment of the present disclosure. As shown in FIG. 3, a teaching video page 31 includes at least one teaching category 32, and each teaching category 32 corresponds to at least one teaching video 33. A target presentation video 34 is determined from the at least one teaching video 33, the target presentation video 34 is enlarged presented, and at least one target task 35 corresponding to the target presentation video 34 is presented.

By determining and differentially displaying the target presentation video, and displaying the target task corresponding to the target presentation video, the user can determine a teaching video corresponding to a currently displayed target task more intuitively.

Optionally, on the basis of any one of the foregoing embodiments, the determining the target presentation video corresponding to the teaching category includes:

determining a first teaching video from at least one teaching video corresponding to the teaching category as the target presentation video; or, in response to a selection operation by the user on any teaching video in the at least one teaching video, determining a teaching video selected by the user as the target presentation video.

In this embodiment, the target teaching video may specifically be a pre-configured teaching video, and may specifically be a first teaching video in the at least one teaching video corresponding to the teaching category. Therefore, after a user's trigger operation on the triggering control, the first teaching video in the at least one teaching video corresponding to the teaching category can be determined, the first teaching video is determined as the target presentation video, the target presentation video is displayed differentially, and at least one target task corresponding to the target presentation video is displayed.

Optionally, after the user has finished watching at least one teaching video under the teaching category, the first one in the teaching videos that are not played currently may be determined as a target presentation video, the target presentation video is displayed differentially, and at least one target task corresponding to the target presentation video is displayed.

Optionally, the target presentation video may also be selected by the user according to an actual demand. Specifically, the user may view at least one teaching video and target task under each teaching category according to an actual demand. Therefore, in response to a selection operation by the user on any teaching video, the teaching video selected by the user may be determined as the target presentation video. The target presentation video is displayed differentially, and at least one target task corresponding to the target presentation video is displayed.

It should be noted that, if the target presentation video is the first teaching video in the at least one teaching video, the target presentation video may be a teaching video different from the target teaching video. If the target presentation video is selected by the user according to an actual demand, the target presentation video may be the target teaching video.

Figure 4:
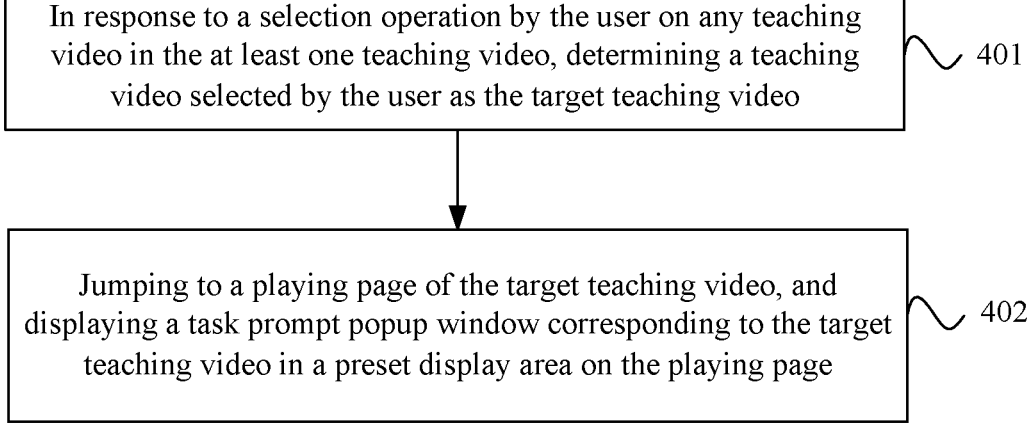
FIG. 4 is a schematic flowchart of a method for displaying a teaching video task according to another embodiment of the present disclosure.

FIG. 4 is a schematic flowchart of a method for displaying a teaching video task according to another embodiment of the present disclosure. On the basis of any one of the foregoing embodiments, after step 102, the method further includes:

step 401: in response to a selection operation by the user on any teaching video in the at least one teaching video, determining a teaching video selected by the user as the target teaching video; and step 402: jumping to a playing page of the target teaching video, and displaying a task prompt popup window corresponding to the target teaching video in a preset display area on the playing page.

In this embodiment, a user can view at least one teaching video and a target task under each teaching category according to an actual demand. Illustratively, an apparatus for displaying a teaching video task may acquire a sliding operation triggered by the user, and perform a switching operation on the at least one teaching category and the at least one teaching video according to a sliding direction of the sliding operation. The apparatus for displaying a teaching video task may also acquire a selection operation by the user on a teaching video, where the selection operation may specifically be generated when the user stops the sliding operation and performs a triggering operation on any teaching video.

In response to the selection of a teaching video by the user, the teaching video selected by the user is determined as the target teaching video, and a playing page of the target teaching video is jumped to. In order to enable a user to view at least one target task corresponding to the target teaching video more intuitively, a task prompt popup window corresponding to the target teaching video can be displayed in a preset display area on the playing page.

Figure 5:
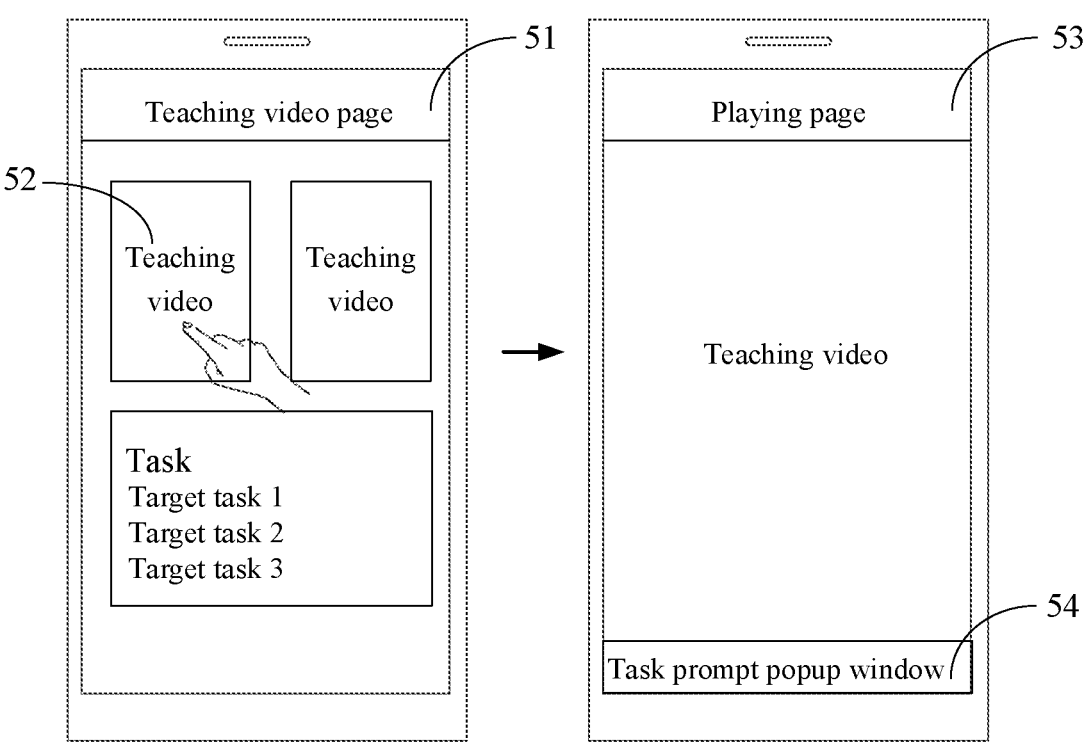
FIG. 5 is another schematic diagram of interface interaction according to an embodiment of the present disclosure.

FIG. 5 is another schematic diagram of interface interaction according to an embodiment of the present disclosure. As shown in FIG. 5, a user can perform a selection operation on any teaching video 52 on a teaching video page 51. In response to the selection operation, it is possible to jump to a playing page 53 corresponding to the teaching video 52 selected by the user, and the teaching video selected by the user is played on the playing page 53. A task prompt popup window 54 is displayed at a lower side of the playing page 53.

Further, based on any one of the foregoing embodiments, after step 402, the method further includes:

in response to a triggering operation by the user on the task prompt popup window, displaying a detail page of at least one target task corresponding to the target teaching video on the playing page, where the detail page includes at least one target task corresponding to a currently played teaching video.

In this embodiment, when the user needs to view at least one target task corresponding to the target teaching video, a triggering operation may be performed on the task prompt popup window. The triggering operation includes, but is not limited to, any one of single clicking, double clicking, long pressing, dragging and sliding. In response to the triggering operation, the detail page of the at least one target task corresponding to the target teaching video may be displayed on the playing page, where the detail page includes at least one target task corresponding to the currently played teaching video.

Figure 6:
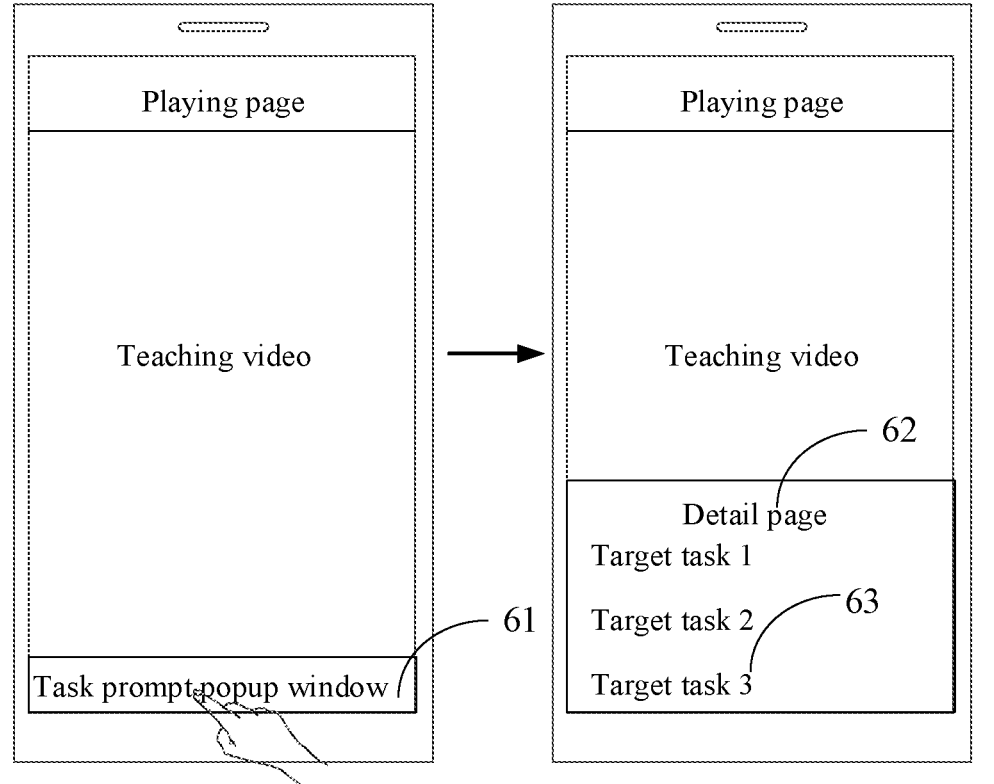
FIG. 6 is another schematic diagram of interface interaction according to an embodiment of the present disclosure.

FIG. 6 is another schematic diagram of interface interaction according to an embodiment of the present disclosure. As shown in FIG. 6, after it is detected that a user triggers a task prompt popup window 61, a detail page 62 of at least one target task corresponding to a target teaching video may be displayed, where the detail page includes at least one target task 63 corresponding to a currently played teaching video.

Optionally, based on any one of the foregoing embodiments, after step 402, the method further includes:

when it is detected that a playing progress of the target teaching video reaches a preset progress threshold value, or a playing duration of the target teaching video reaches a preset duration threshold value, displaying a detail page of at least one target task corresponding to the target teaching video on the playing page, where the detail page includes at least one target task corresponding to a currently played teaching video.

In this embodiment, when watching a teaching video, a user may not actively click a task prompt popup window, or the user may not notice the task prompt popup window. Therefore, in order to enable the user to more intuitively view at least one target task corresponding to a target teaching video, when it is detected that the playing progress of the target teaching video reaches a preset progress threshold value, or the playing duration of the target teaching video reaches a preset duration threshold value, a detail page of at least one target task corresponding to the target teaching video may be automatically displayed on the playing page, where the detail page includes at least one target task corresponding to the currently played teaching video.

Optionally, when it is detected that the playing progress of the target teaching video reaches a preset progress threshold value, it may be further detected whether a triggering operation by a user on a task prompt popup window has been acquired. If the triggering operation is acquired, the at least one target task corresponding to the target teaching video may be automatically presented. Otherwise, the at least one target task corresponding to the target teaching video may not be presented. Thus, frequently displaying a detail page can be avoided and the user experience can be improved.

In the method for displaying a teaching video task provided by the embodiment, at least one target task corresponding to the target teaching video is displayed on a playing page according to the triggering operation by the user on the task prompt popup window, or when it is detected that the playing progress of the target teaching video reaches a preset progress threshold value, or when it is detected that the playing duration of the target teaching video reaches a preset duration threshold value, so that the user can learn of the at least one target task corresponding to the target teaching video more intuitively. Further, the user can be guided to watch the teaching video by means of the target task, and to complete the target task corresponding to the teaching video. On the basis of improving the learning motivation of the user, a triggering flow of the target task is simplified, and the user experience is improved.

Figure 7:
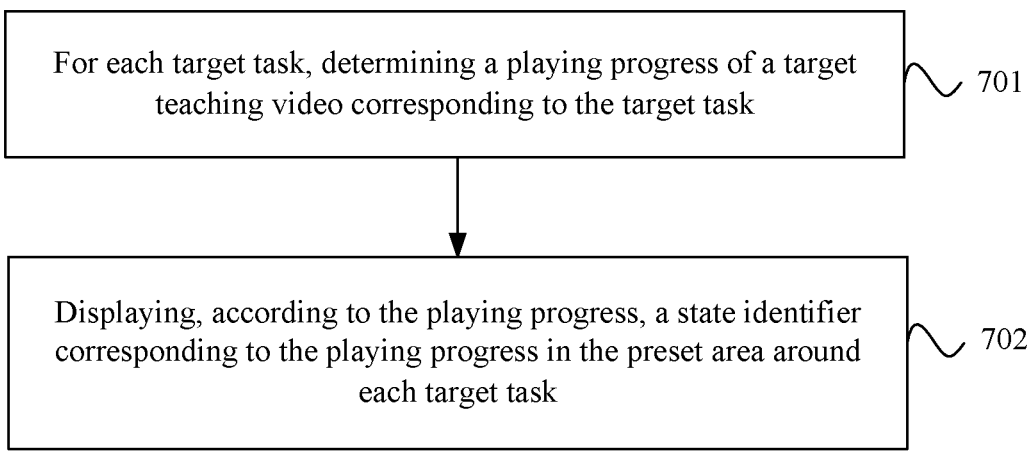
FIG. 7 is a schematic flowchart of a method for displaying a teaching video task according to another embodiment of the present disclosure.

FIG. 7 is a schematic flowchart of a method for displaying a teaching video task according to another embodiment of the present disclosure. On the basis of any one of the foregoing embodiments, a preset area around each target task further includes a state identifier corresponding to the target task; and as shown in FIG. 7, the method further includes:

step 701: for each target task, determining a playing progress of a target teaching video corresponding to the target task; and step 702: displaying, according to the playing progress, a state identifier corresponding to the playing progress in the preset area around each target task.

In this embodiment, in order to enable a user to better grasp teaching contents of the teaching video, the target task may be unlocked after it is detected that the user has watched the teaching video for a period of time. Specifically, the state identifier may be set in a preset area around each target task, for example, the state identifier may be set at the rear side of the target task.

Further, with regard to each target task, a playing progress of a target teaching video having an association relationship with the target task may be detected. A state identifier corresponding to the playing progress is determined, and the state identifier corresponding to the playing progress is displayed in a preset area around each target task.

Further, based on any one of the foregoing embodiments, step 702 includes:

for each target task in the playing page, when it is detected that the playing progress of the target teaching video does not reach a preset progress threshold value, displaying a preset first state identifier; and when it is detected that the playing progress reaches the preset progress threshold value, switching the first state identifier to a preset second state identifier;

where the first state identifier is configured to be in a non-triggerable state, and the second state identifier is configured to be in a triggerable state.

In this embodiment, in order to enable a user to understand a state of a target task more intuitively during a learning process, a state identifier of the target task may be adjusted on the playing page. Specifically, within the playing page, for each target task, it can be detected whether the playing progress of the currently played target teaching video reaches a preset progress threshold value. The progress threshold value may specifically be 90%. The progress threshold value may be a preset threshold value, and may also be set by a user according to an actual demand, which is not limited in the present disclosure.

Further, when it is detected that the playing progress does not reach the progress threshold value, it is indicated that the user learns the teaching video for a relatively short time, and in this case, a preset first state identifier can be displayed. The first state identifier may specifically indicate that the target task is in a locked state, and in the locked state, the first state identifier cannot be triggered by the user. When it is detected that the playing progress reaches the progress threshold value, it is indicated that the user has learned most of the teaching video, and can master teaching contents of the teaching video. In this case, the first state identifier may be switched to a preset second state identifier, where the second state identifier may specifically indicate that the target task is in an unlocked state, and in the unlocked state, the user may trigger the second state identifier to implement processing of the target task.

Figure 8:
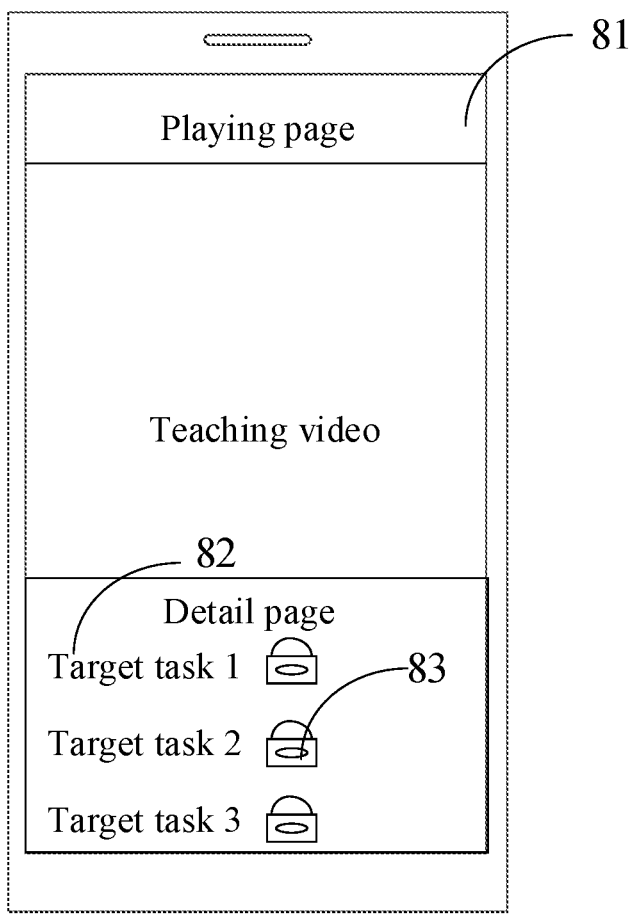
FIG. 8 is another schematic diagram of a display interface according to an embodiment of the present disclosure.

FIG. 8 is another schematic diagram of a display interface according to an embodiment of the present disclosure. As shown in FIG. 8, on a playing page 81, if a playing progress of a current target teaching video does not exceed a preset progress threshold value, a first state identifier 83 may be displayed at the rear side of each target task 82, where the first state identifier 83 may be a locked identifier.

Figure 9:
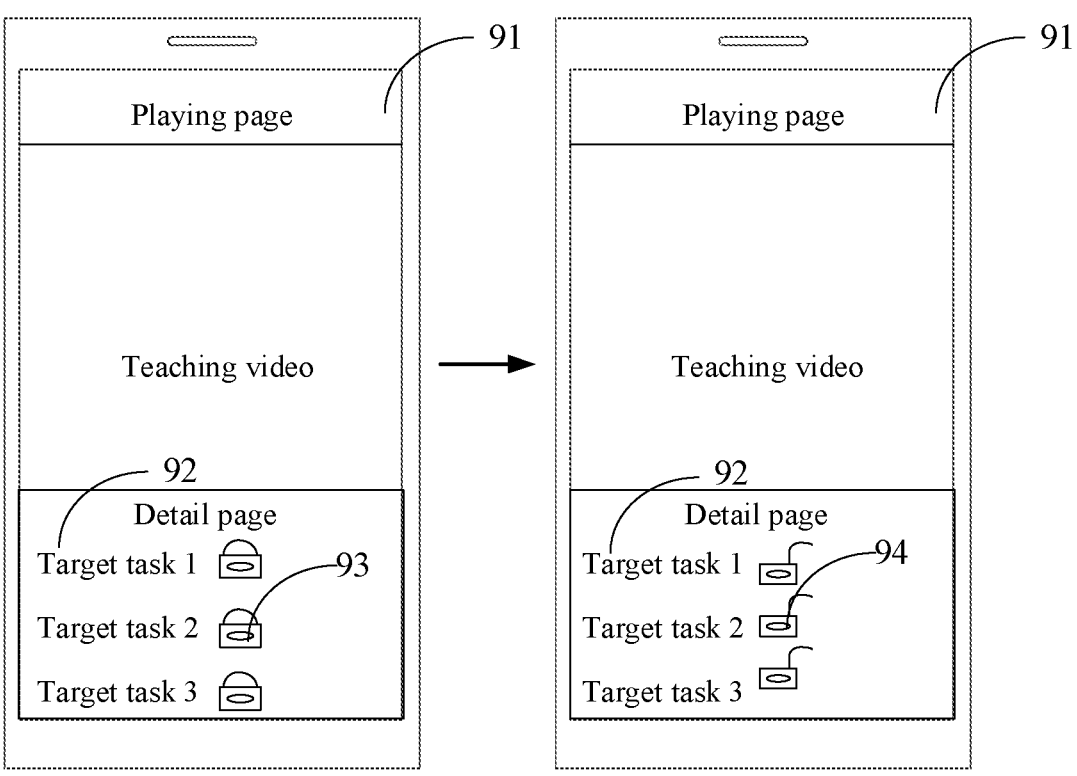
FIG. 9 is another schematic diagram of interface interaction according to an embodiment of the present disclosure.

FIG. 9 is another schematic diagram of interface interaction according to an embodiment of the present disclosure. As shown in FIG. 9, on a playing page 81, if a playing progress of a current target teaching video reaches a preset progress threshold value, a first state identifier 93 displayed at the rear side of each target task 92 may be switched to a second state identifier 94, where the second state identifier 94 may specifically be an unlocked identifier.

Further, on the basis of any one of the foregoing embodiments, after switching the first state identifier to a preset second state identifier, the method further includes:

in response to a triggering operation by the user on the second state identifier corresponding to any target task on the playing page, jumping to a task processing interface corresponding to the target task; and performing, according to a completion state of the target task, a switching operation on a state identifier corresponding to the target task on the playing page.

In this embodiment, when a state identifier corresponding to a target task is a preset second state identifier, it represents that the target task is in an unlocked state, and in the unlocked state, a user can trigger the second state identifier to implement the processing of the target task. Therefore, in response to the triggering operation by the user on the second state identifier corresponding to any target task on the playing page, the task processing interface corresponding to the target task may be jumped to.

Figure 10:
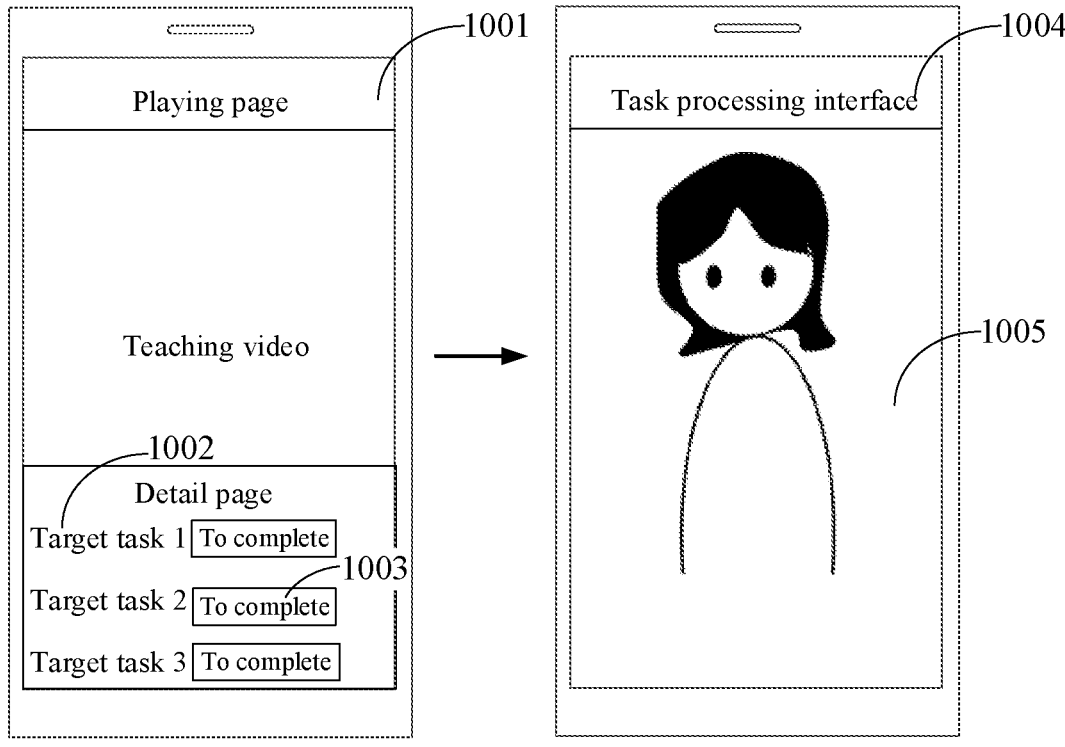
FIG. 10 is another schematic diagram of interface interaction according to an embodiment of the present disclosure.

FIG. 10 is another schematic diagram of interface interaction according to an embodiment of the present disclosure. As shown in FIG. 10, on a playing page 1001, if a state identifier corresponding to a current target task 1002 is a second state identifier 1003, when a triggering operation by a user on any second state identifier 1003 is acquired, a task processing interface 1004 of the target task may be jumped to. Taking the target task being doing a live stream as an example, the task processing interface 1004 may display live stream content 1005 of the user.

Further, the apparatus for displaying a teaching video task may detect a completion state of each target task, and perform a switching operation on a state identifier corresponding to the target task on the playing page according to the completion state.

Further, on the basis of any one of the foregoing embodiments, the performing, according to the completion state of the target task, the switching operation on the state identifier corresponding to the target task on the playing page includes:

when it is detected that a state of any target task on the playing page is a completed state, switching the state identifier corresponding to the target task to a preset third state identifier; where the third state identifier is used for indicating that the target task is completed.

In this embodiment, when it is detected that a state of any target task on the playing page is a completed state, the state identifier corresponding to the target task may be switched to a preset third state identifier. The third state identifier is specifically used for indicating that the target task is completed. For example, the third state identifier may specifically be a tick mark, or the third state identifier may specifically be characters of "Completed", so as to prompt the user that the target task is completed, thereby enabling the user to more intuitively learn of a completion state of the target task.

Figure 11:
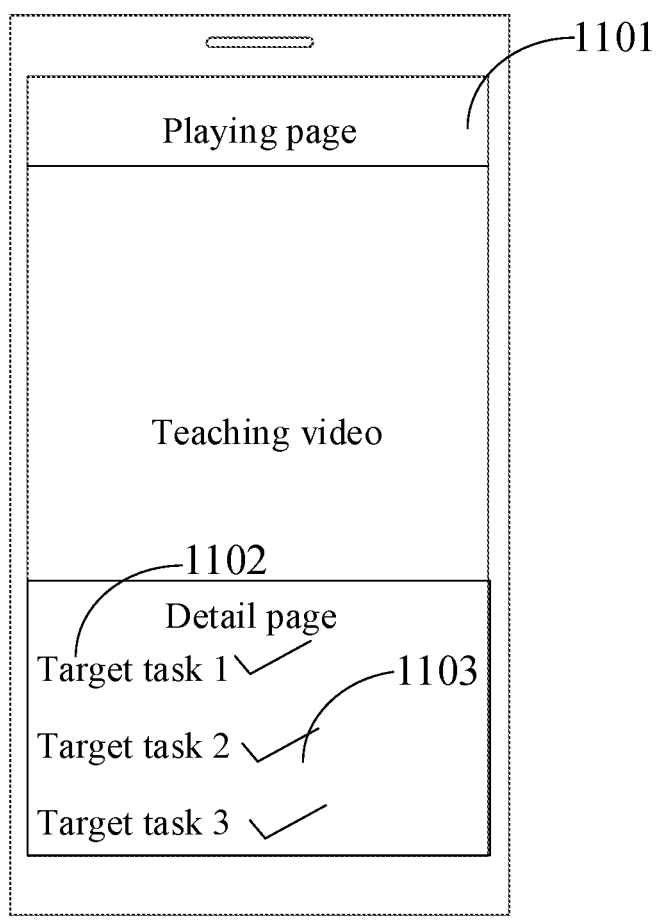
FIG. 11 is another schematic diagram of a display interface according to an embodiment of the present disclosure.

FIG. 11 is another schematic diagram of a display interface according to an embodiment of the present disclosure.

As shown in FIG. 11, on a playing page 1101, when it is detected that a state of any current target task 1102 is a completed state, a preset third state identifier 1103 may be displayed at a rear side of the target task, where the third state identifier may specifically be a tick mark.

In the method for displaying a teaching video task provided by the present embodiment, a state identifier of a target task is adjusted according to a playing progress, so that a user can better grasp contents of the teaching video on the basis of more intuitively learning of a state of the target task. Thus, the user can be guided to learn the teaching video better, thereby improving the learning motivation of the user.

Further, based on any one of the foregoing embodiments, step 702 includes:

for each target task on the teaching video page, when it is detected that the playing progress of the teaching video corresponding to the target task does not reach a preset progress threshold value, displaying a preset first state identifier; and when it is detected that the playing progress of the teaching video corresponding to the target task reaches the preset progress threshold value, switching the first state identifier to a preset second state identifier;

where the first state identifier is configured to be in a non-triggerable state, and the second state identifier is configured to be in a triggerable state.

In this embodiment, in a playing process of a teaching video, a user can trigger a return control to return to the teaching video page, and therefore, in order to enable the user to learn of a state of a target task more intuitively, a state identifier of the target task displayed on the teaching video page can also be adjusted according to the playing progress. Specifically, for each target task on the teaching video page, it can be detected whether a playing progress of a teaching video corresponding to the target task reaches a preset progress threshold value. The progress threshold value may specifically be 90%. The progress threshold value may be a preset threshold value, and may also be set by a user according to an actual demand, which is not limited in the present disclosure.

Further, when it is detected that the playing progress does not reach the progress threshold value, it is indicated that the user learns the teaching video for a relatively short time, and in this case, a preset first state identifier can be displayed on the teaching video page, where the first state identifier may specifically indicate that the target task is in a locked state, and in the locked state, the first state identifier cannot be triggered by the user. When it is detected that the playing progress reaches the progress threshold value, it is indicated that the user has learned most of the teaching video, and can master teaching contents of the teaching video. In this case, the first state identifier on the teaching video page may be switched to a preset second state identifier, where the second state identifier may specifically indicate that the target task is in an unlocked state, and in the unlocked state, the user may trigger the second state identifier to implement processing of the target task.

Figure 12:
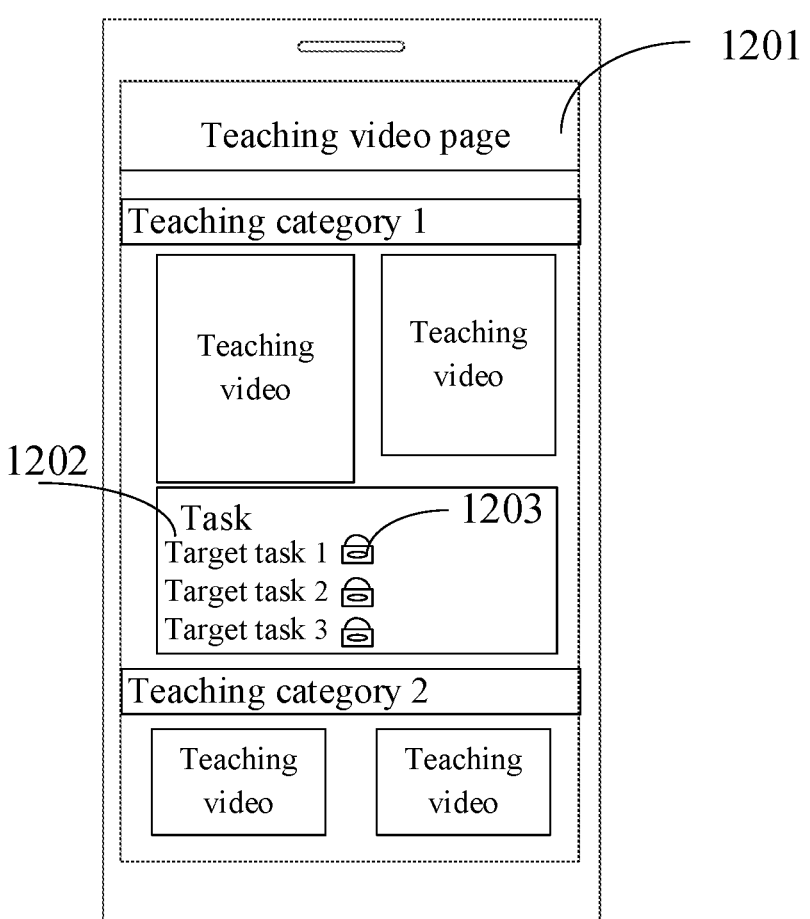
FIG. 12 is another schematic diagram of a display interface according to an embodiment of the present disclosure.

FIG. 12 is another schematic diagram of a display interface according to an embodiment of the present disclosure. As shown in FIG. 12, on a teaching video page 1201, when it is detected that a playing progress of a target teaching video 1202 does not exceed a preset progress threshold value, a preset first state identifier 1204 may be displayed at a rear side of at least one target task 1203 corresponding to the target teaching video, where the preset first state identifier 1204 may be a locked identifier.

Figure 13:
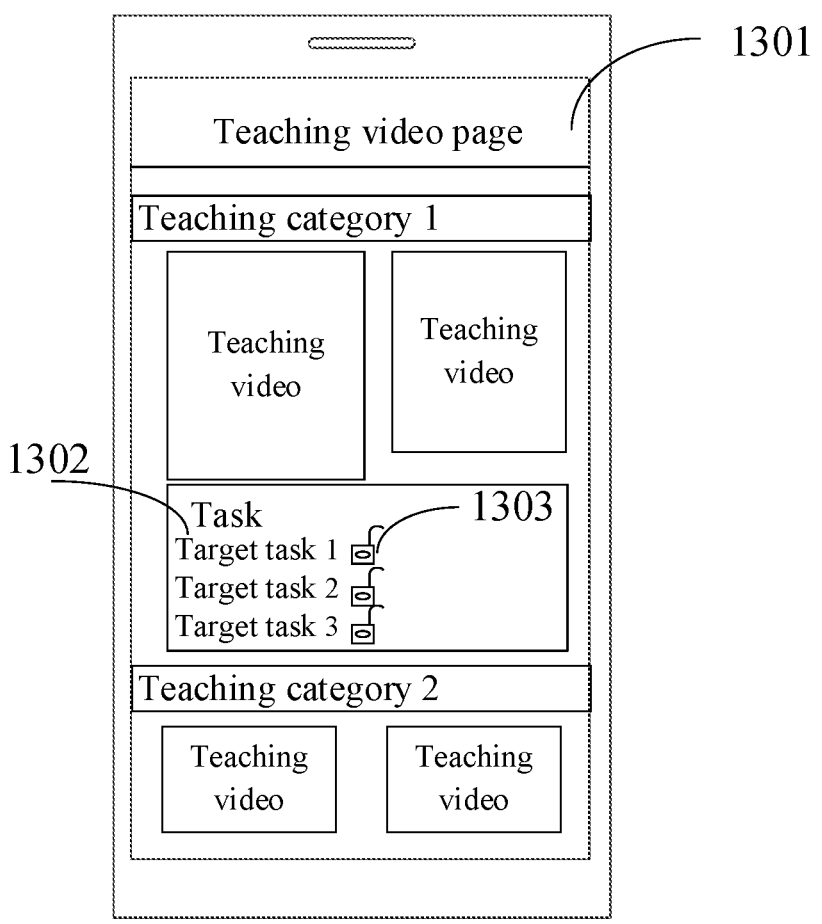
FIG. 13 is another schematic diagram of a display interface according to an embodiment of the present disclosure.

FIG. 13 is another schematic diagram of a display interface according to an embodiment of the present disclosure. As shown in FIG. 13, on a teaching video page 1301, when it is detected that a playing progress of a target teaching video 1302 reaches a preset progress threshold value, a preset second state identifier 1304 may be displayed at a rear side of at least one target task 1303 corresponding to the target teaching video, where the preset second state identifier 1204 may be an unlocked identifier.

Further, on the basis of any one of the foregoing embodiments, after the switching the first state identifier to a preset second state identifier, the method further includes:

in response to a triggering operation by the user on the second state identifier corresponding to any target task on the teaching video page, jumping to a task processing interface corresponding to the target task; and performing, according to a completion state of the target task, a switching operation on a state identifier corresponding to the target task on the teaching video page.

In this embodiment, when a state identifier corresponding to a target task is a preset second state identifier, it represents that the target task is in an unlocked state, and in the unlocked state, a user can trigger the second state identifier to implement the processing of the target task. Therefore, in response to the triggering operation by the user on the second state identifier corresponding to any target task on the teaching video page, it is possible to jump to the task processing interface corresponding to the target task. A completion state of each target task is detected, and a switching operation is performed on a state identifier corresponding to the target task on the teaching video page according to the completion state.

Further, on the basis of any one of the foregoing embodiments, the performing, according to the completion state of the target task, the switching operation on the state identifier corresponding to the target task on the teaching video page includes:

when it is detected that a state of any target task on the teaching video page is a completed state, switching the state identifier corresponding to the target task to a preset third state identifier;

where the third state identifier is used for indicating that the target task is completed.

In this embodiment, when it is detected that a state of any target task on the teaching video page is a completed state, the state identifier corresponding to the target task may be switched to a preset third state identifier. The third state identifier is specifically used for indicating that the target task is completed. For example, the third state identifier may specifically be a tick mark, or the third state identifier may specifically be characters of "Completed", so as to prompt the user that the target task is completed, thereby enabling the user to more intuitively learn of a completion state of the target task.

Figure 14:
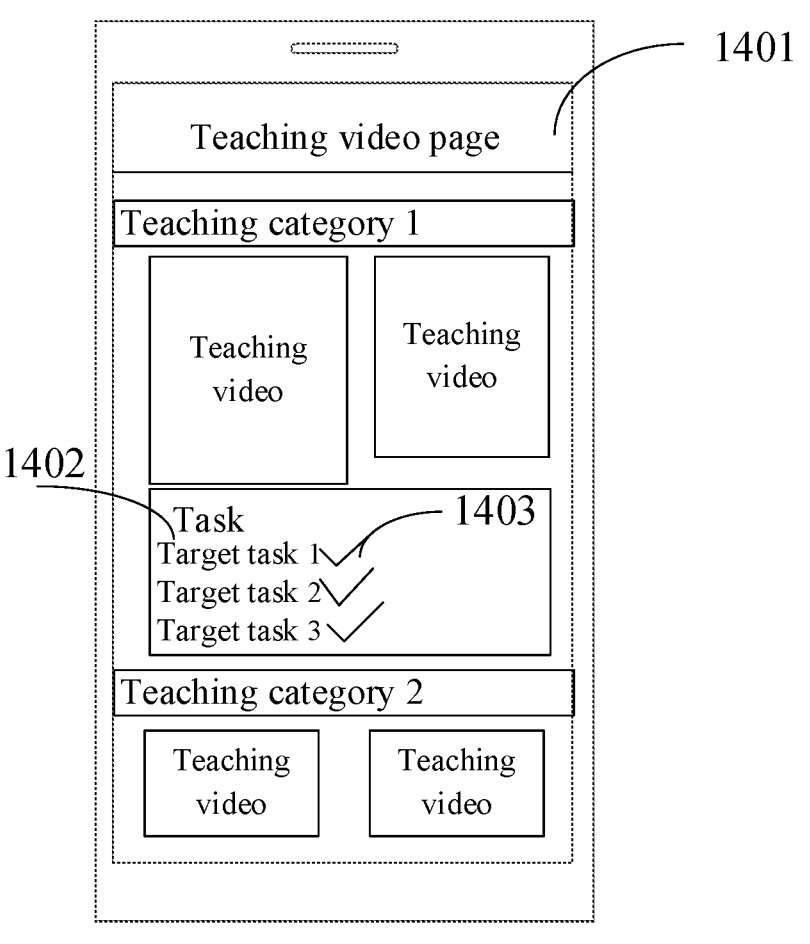
FIG. 14 is another schematic diagram of a display interface according to an embodiment of the present disclosure.

FIG. 14 is another schematic diagram of a display interface according to an embodiment of the present disclosure. As shown in FIG. 14, on a teaching video page 1401, when it is detected that a state of any target task 1403 corresponding to a target teaching video 1402 is a completed state, a preset third state identifier 1404 may be displayed at a rear side of the target task 1403, where the preset third state identifier 1204 may be a tick mark.

In the method for displaying a teaching video task provided by the present embodiment, a state identifier of a target task is adjusted according to a playing progress, so that a user can better grasp contents of the teaching video on the basis of more intuitively learning of a state of the target task.

Figure 15:
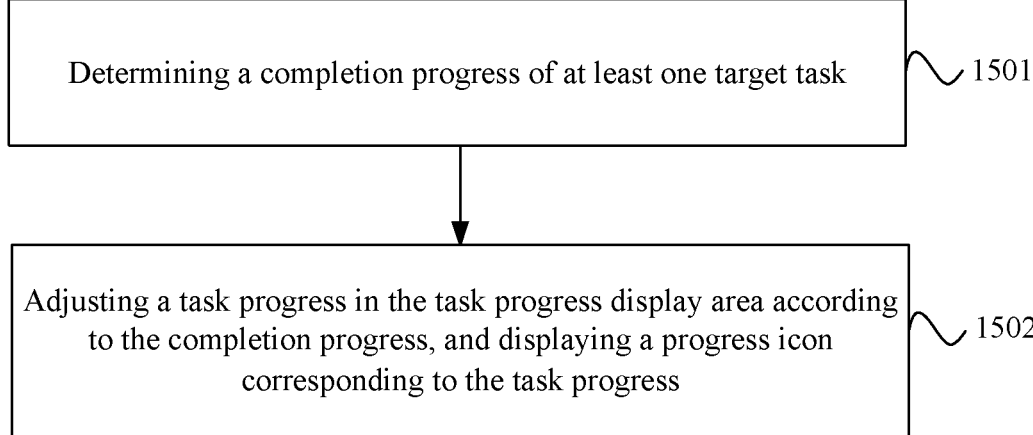
FIG. 15 is a schematic flowchart of a method for displaying a teaching video task according to another embodiment of the present disclosure.

FIG. 15 is a schematic flowchart of a method for displaying a teaching video task provided by another embodiment of the present disclosure. On the basis of any one of the foregoing embodiments, a teaching video page further includes a task progress display area. As shown in FIG. 15, after step 102, the method further includes:

step 1501: determining a completion progress of at least one target task; and step 1502: adjusting a task progress in the task progress display area according to the completion progress, and displaying a progress icon corresponding to the task progress.

In this embodiment, in order to enable a user to more intuitively learn of a completion progress of the current at least one target task, the teaching video page further includes a task progress display area. Specifically, the apparatus for displaying a teaching video task can determine a completion progress of at least one target task, where the completion progress may specifically be completed or uncompleted. The task progress in the task progress display area is adjusted according to the completion progress of the target task, and a progress icon corresponding to the task progress is displayed.

Figure 16:
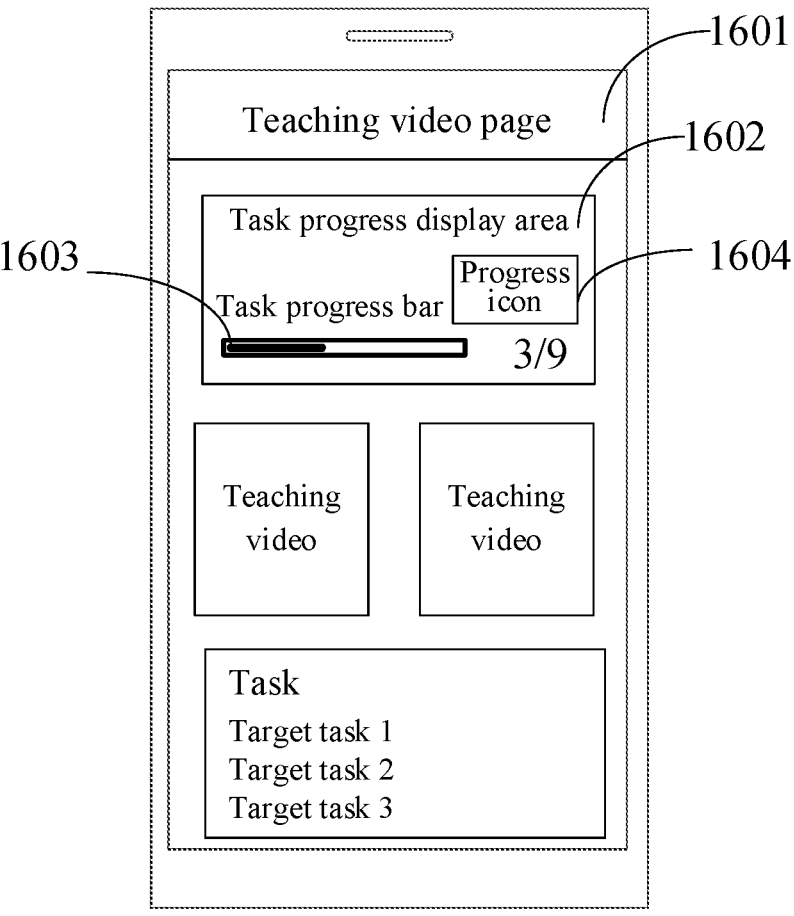
FIG. 16 is another schematic diagram of a display interface according to an embodiment of the present disclosure.

FIG. 16 is another schematic diagram of a display interface according to an embodiment of the present disclosure. As shown in FIG. 16, a teaching video page 1601 includes a task progress display area 1602, where a task progress bar 1603 corresponding to at least one target task may be displayed in the task progress display area 1602, and the task progress bar 1603 in the task progress display area may be adjusted according to a completion progress of the target task. In addition, a progress icon 1604 corresponding to the task progress bar 1603 may also be displayed.

Further, based on any one of the foregoing embodiments, step 902 includes:

when it is detected that a quantity of currently completed target progress does not match a preset task threshold value, displaying a preset first progress icon; and when it is detected that the quantity of currently completed target progress matches a preset task threshold value, switching the first progress icon into a preset second progress icon;

where the first progress icon is configured to be in a non-triggerable state, and the second progress icon is configured to be in a triggerable state.

In this embodiment, a phased award may be set to increase the learning enthusiasm of a user for a teaching video. Each stage is configured with a different quantity of target tasks, and different progress icons are displayed according to the quantity of completed target tasks. Specifically, when it is detected that the quantity of currently completed target progress does not match a preset task threshold value, a preset first progress icon is displayed, where the first progress icon is configured to be in a non-triggering state. When it is detected that the quantity of currently completed target progress matches the preset task threshold value, the first progress icon is switched to a preset second progress icon, where the second progress icon is configured to be in a triggerable state.

Further, on the basis of any one of the foregoing embodiments, after the switching the first progress icon to the preset second progress icon, the method further includes:

in response to a triggering operation by the user on the second progress icon, issuing to an account of the user a virtual resource matching the task progress.

In this embodiment, after a user completes the target task(s) of a phase, a virtual resource may be issued to an account of the user as a reward. Specifically, after the first progress icon is switched to the preset second progress icon, the user may perform a triggering operation on the second progress icon. Correspondingly, in response to the triggering operation by the user on the second progress icon, a virtual resource matching the task progress may be issued to an account of the user.

In the method for displaying a teaching video task provided by the present embodiment, a progress icon corresponding to a task progress is displayed in a task progress display area of a teaching video page, so that a user can view a completion degree of a target task more intuitively. In addition, a phased learning task is set, and after the user completes the target task(s) of a phase, a virtual resource may be issued to an account of the user as a reward according to a triggering operation of the user, thereby improving learning motivation of the user, and further improving user experience.

Figure 17:
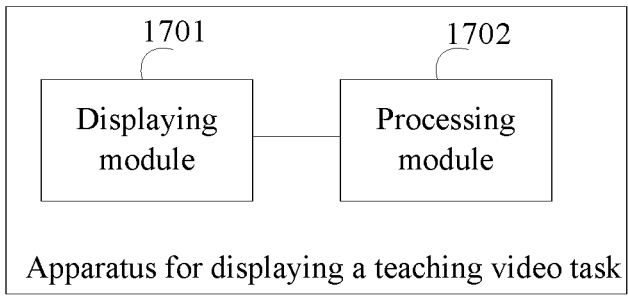
FIG. 17 is a schematic structural diagram of an apparatus for displaying a teaching video task according to an embodiment of the present disclosure.

FIG. 17 is a schematic structural diagram of an apparatus for displaying a teaching video task according to an embodiment of the present disclosure. As shown in FIG. 17, the apparatus includes: a displaying module 1701 and a processing module 1702. The displaying module 1701 is configured to display a triggering control corresponding to a teaching video page on a display interface. The processing module 1702 is configured to jump to the teaching video page in response to a triggering operation by a user on the triggering control, where the teaching video page includes at least one teaching video and at least one target task corresponding to the teaching video.

Further, on the basis of any one of the foregoing embodiments, the teaching video page includes at least one teaching category, where each teaching category includes at least one teaching video. The processing module is configured to determine, for each teaching category, a target presentation video corresponding to the teaching category, and perform differentiated display on the target presentation video and display at least one target task corresponding to the target presentation video. The differentiated display includes any one of enlarged display and highlighted display.

Further, on the basis of any one of the foregoing embodiments, the processing module is configured to: determine a first teaching video from at least one teaching video corresponding to the teaching category as the target presentation video; or, in response to a selection operation by the user on any teaching video in the at least one teaching video, determine a teaching video selected by the user as the target presentation video.

Further, on the basis of any one of the foregoing embodiments, the apparatus further includes: a determining module, configured to determine, in response to a selection operation by the user on any teaching video in the at least one teaching video, a teaching video selected by the user as the target teaching video; and a jumping module, configured to jump to a playing page of the target teaching video, and display a task prompt popup window corresponding to the target teaching video in a preset display area on the playing page.

Further, on the basis of any one of the foregoing embodiments, the apparatus further includes: a displaying module, configured to display a detail page of at least one target task corresponding to the target teaching video on the playing page in response to a triggering operation by the user on the task prompt popup window, where the detail page includes at least one target task corresponding to a currently played teaching video.

Further, on the basis of any one of the foregoing embodiments, the apparatus further includes: a displaying module, configured to: when it is detected that a playing progress of the target teaching video reaches a preset progress threshold value, or, when a playing duration of the target teaching video reaches a preset duration threshold value, display a detail page of at least one target task corresponding to the target teaching video on the playing page, where the detail page includes at least one target task corresponding to a currently played teaching video.

Further, on the basis of any one of the foregoing embodiments, a preset area around each target task further includes a state identifier corresponding to the target task. The apparatus further includes a progress determining module, configured to determine, for each target task, a playing progress of a target teaching video corresponding to the target task; and a displaying module, configured to display a state identifier corresponding to the playing progress in the preset area around each target task according to the playing progress.

Further, on the basis of any one of the foregoing embodiments, the displaying module is configured to: for each target task on the playing page, when it is detected that the playing progress of the target teaching video does not reach a preset progress threshold value, display a preset first state identifier; and when it is detected that the playing progress reaches the preset progress threshold value, switch the first state identifier to a preset second state identifier. The first state identifier is configured to be in a non-triggerable state, and the second state identifier is configured to be in a triggerable state.

Further, on the basis of any one of the foregoing embodiments, the displaying module is further configured to: in response to a triggering operation by the user on the second state identifier corresponding to any target task on the playing page, jump to a task processing interface corresponding to the target task; and according to a completion state of the target task, perform a switching operation on a state identifier corresponding to the target task on the playing page.

Further, on the basis of any one of the foregoing embodiments, the displaying module is configured to: when it is detected that a state of any target task on the playing page is a completed state, switch the state identifier corresponding to the target task to a preset third state identifier, where the third state identifier is used for indicating that the target task is completed.

Further, on the basis of any one of the foregoing embodiments, the displaying module is configured to: for each target task on the teaching video page, when it is detected that the playing progress of the teaching video corresponding to the target task does not reach a preset progress threshold value, display a preset first state identifier; and when it is detected that the playing progress of the teaching video corresponding to the target task reaches the preset progress threshold value, switch the first state identifier to a preset second state identifier. The first state identifier is configured to be in a non-triggerable state, and the second state identifier is configured to be in a triggerable state.

Further, on the basis of any one of the foregoing embodiments, the displaying module is further configured to: in response to a triggering operation by the user on the second state identifier corresponding to any target task on the teaching video page, jump to a task processing interface corresponding to the target task; and according to a completion state of the target task, perform a switching operation on a state identifier corresponding to the target task on the teaching video page.

Further, on the basis of any one of the foregoing embodiments, the displaying module is configured to: when it is detected that a state of any target task on the teaching video page is a completed state, switch the state identifier corresponding to the target task to a preset third state identifier, where the third state identifier is used for indicating that the target task is completed.

Further, on the basis of any one of the foregoing embodiments, the teaching video page further includes a task progress display area. The apparatus further includes: a determining module, further configured to: determine a completion progress of at least one target task; and an adjusting module, configured to adjust a task progress in the task progress display area according to the completion progress, and display a progress icon corresponding to the task progress.

Further, on the basis of any of the foregoing embodiments, the adjusting module is configured to: display a preset first progress icon when it is detected that a quantity of currently completed target progress does not match a preset task threshold; and switch the first progress icon to a preset second progress icon when it is detected that the quantity of currently completed target progress matches the preset task threshold value. The first progress icon is configured to be in a non-triggerable state, and the second progress icon is configured to be in a triggerable state.

Further, on the basis of any of the foregoing embodiments, the apparatus further includes: an issuing module, configured to, in response to a triggering operation by the user on the second progress icon, issue, to an account of the user, a virtual resource matching the task progress.

The apparatus provided in the embodiment may be used to execute technical solutions of the foregoing method embodiments, and implementation principles and technical effects thereof are similar, which are not repeatedly described herein in the embodiment.

In order to implement the foregoing embodiments, the embodiments of the present disclosure further provide an electronic device, including: a processor and a memory;

the memory stores computer executable instructions; and the processor executes the computer executable instructions stored in the memory, to cause the processor to execute the method for displaying a teaching video task according to any one of the foregoing embodiments.

Figure 18:
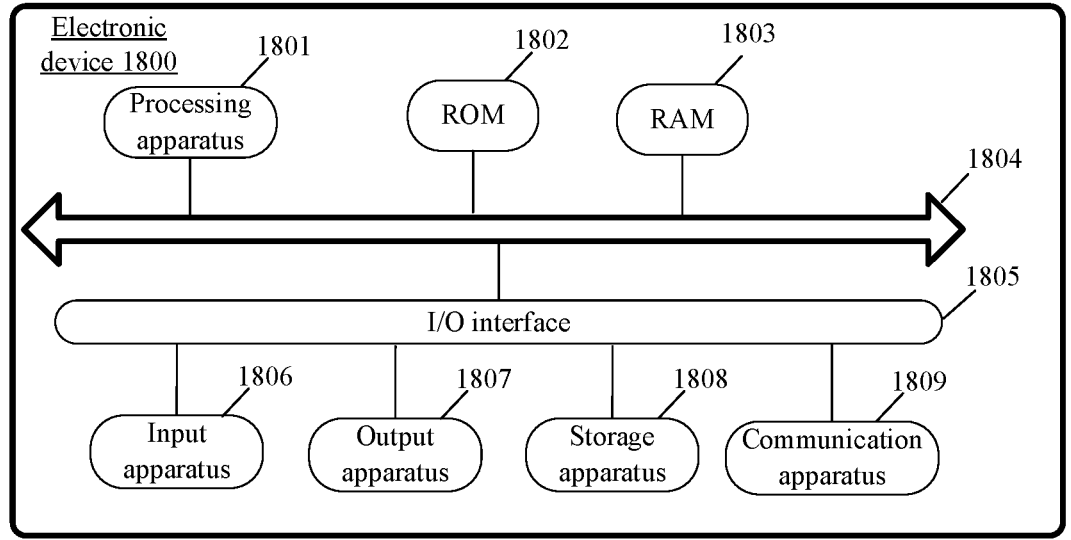
FIG. 18 is a schematic structural diagram of an electronic device according to an embodiment of the present disclosure.

FIG. 18 is a schematic structural diagram of an electronic device according to an embodiment of the present disclosure. As shown in FIG. 18, the electronic device 1800 may be a terminal device or a server. The terminal device may include, but is not limited to, a mobile terminal such as a mobile phone, a laptop computer, a digital broadcast receiver, a personal digital assistant (Personal Digital Assistant, PDA), a tablet computer (Portable Android Device, PAD), a portable multimedia player (Portable Media Player, PMP), a vehicle-mounted terminal (for example, a vehicle-mounted navigation terminal), and the like, and a fixed terminal such as a digital TV, a desktop computer, and the like. The electronic device shown in FIG. 18 is merely an example and should not bring any limitation to the functions and scope of use of the embodiments of the present disclosure.

As shown in FIG. 18, the electronic device 1800 may include a processing apparatus (e.g., a central processing unit, a graphics processor, etc.) 1801 that may perform various suitable actions and processing according to a program stored in a read only memory (Read Only Memory, ROM) 1802 or a program loaded into a random access memory (Random Access Memory, RAM) 1803 from a storage apparatus 1808. In the RAM 1803, various programs and data which are necessary for the operation of the electronic device 1800 are also stored. The processing apparatus 1801, the ROM 1802, and the RAM 1803 are connected to one another via a bus 1804. An input/output (I/O) interface 1805 is also connected to the bus 1804.

In general, the following apparatuses may be connected to the I/O interface 1805: an input apparatus 1806 including, for example, a touch screen, a touch pad, a keyboard, a mouse, a camera, a microphone, an accelerometer, a gyroscope, and the like; an output apparatus 1807 including, for example, a liquid crystal display (Liquid Crystal Display, LCD), a speaker, a vibrator, and the like; a storage apparatus 1808 including, for example, a magnetic tape, a hard disk, and the like; and a communication apparatus 1809. The communication apparatus 1809 may allow the electronic device 1800 to exchange data with other devices in a wireless or wired communication. While FIG. 18 illustrates an electronic device 1800 with a variety of apparatuses, it should be understood that it is not required that all of the illustrated apparatuses be implemented or provided. More or fewer apparatuses may alternatively be implemented or provided.

In particular, the processes described above with reference to the flowcharts may be implemented as computer software programs according to the embodiments of the present disclosure. For example, the embodiments of the present disclosure include a computer program product including a computer program carried on a computer readable medium. The computer program includes program codes for executing the method as shown in the flowcharts. In such an embodiment, the computer program may be downloaded and installed from a network via the communication apparatus 1809, installed from the storage apparatus 1808, or installed from the ROM 1802. When the computer program is executed by the processing apparatus 1801, the above described functions defined in the method embodiments of the present disclosure are executed.

It should be noted that, the computer readable medium in the present disclosure may be a computer readable signal medium or a computer readable storage medium, or any combination thereof. The computer readable storage medium may be, for example, but not limited to, an electronic, magnetic, optical, electromagnetic, infrared or semiconductor system, apparatus or device, or any suitable combination of the foregoing. More specific examples of the computer readable storage medium may include, but are not limited to, an electrical connection based on one or more wires, a portable computer diskette, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing. In the present disclosure, the computer readable storage medium may be any tangible medium that contains or stores a program for use by or in combination with an instruction execution system, apparatus or device. While in the present disclosure, the computer readable signal medium may include data signals propagated in a baseband or as part of a carrier wave, in which computer readable program codes are carried. Such propagated signals may take a variety of forms, including, but not limited to, an electro-magnetic signal, an optical signal, or any suitable combination thereof. The computer readable signal medium may also be any computer readable medium that is not a computer readable storage medium, and can send, propagate or transmit a program for use by or in combination with an instruction execution system, apparatus or device. Program codes contained on the computer readable medium may be transmitted using any appropriate medium, including, but not limited to, a wireline, an optical fiber cable, RF (radio frequency), etc., or any suitable combination of the foregoing.

The computer readable medium may be included in the electronic device, or may exist alone and not be installed in the electronic device.

The computer readable medium carries one or more programs, and when the one or more programs are executed by the electronic device, the electronic device is caused to execute the method shown in the foregoing embodiments.

Computer program codes for carrying out operations of the present disclosure may be written in one or more programming languages or any combination thereof, the programming languages including an object oriented programming language such as Java, Smalltalk, C++ and a conventional procedural programming language such as C programming language or similar programming languages. The program codes may be executed entirely on a user computer, executed partly on a user computer, executed as a stand-alone software package, executed partly on a user computer and partly on a remote computer, or executed entirely on a remote computer or server. In the scenario involving a remote computer, the remote computer may be connected to a user computer through any type of network, including a local area network (Local Area Network, LAN) or a wide area network (Wide Area Network, WAN), or may be connected to an external computer (for example, through the Internet of an Internet service provider).

Another embodiment of the present disclosure further provides a computer readable storage medium. The computer readable storage medium stores computer executable instructions. When a processor executes the computer executable instructions, the method for displaying a teaching video task according to any one of the foregoing embodiments is implemented.

Another embodiment of the present disclosure further provides a computer program product, including a computer program, and when the computer program is executed by a processor, the method for displaying a teaching video task according to any one of the foregoing embodiments is implemented.

The flowcharts and block diagrams in the accompanying drawings illustrate architectures, functionalities and operations of possible implementations of systems, methods and computer program products according to various embodiments of the present disclosure. In this regard, each block in the flowcharts or block diagrams may represent a module, a program segment, or a portion of code, which includes one or more executable instructions for implementing specified logical function(s). It should also be noted that, in some alternative implementations, the functions noted in the blocks may be implemented in an order different from those noted in the drawings. For example, two blocks shown in succession may, in fact, be executed substantially concurrently, or the blocks may sometimes be executed in the reverse order, depending upon the involved functionality. It should also be noted that, each block of the block diagrams and/or flowcharts and combinations of blocks in the block diagrams and/or flowcharts may be implemented by a special-purpose hardware-based system that performs specified functions or operations, or combinations of special-purpose hardware and computer instructions.

The units involved in the embodiments of the present disclosure may be implemented through software or hardware. The name of a unit does not constitute a limitation to the unit itself in some cases.

The above functions described herein may be performed, at least in part, by one or more hardware logic components. For example, unrestrictedly, exemplary types of hardware logic components that can be used include: a Field Programmable Gate Array (FPGA), an Application Specific Integrated Circuit (ASIC), an Application Specific Standard Product (ASSP), a System on chip (SOC), a Complex Programmable Logic Device (CPLD), etc.

In the context of the present disclosure, a machine-readable medium may be a tangible medium that may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium include an electrical connection based on one or more wires, a portable computer diskette, a hard disk, a random access memory (RAM), a read only memory (ROM), an erasable programmable read only memory (EPROM or flash memory), an optical fiber, a compact disc read only memory (CD-ROM), an optical storage device, a magnetic storage device, or any suitable combination of the foregoing.

In a first aspect, according to one or more embodiments of the present disclosure, provided is a method for displaying a teaching video task, including:

displaying a triggering control corresponding to a teaching video page on a display interface; and jumping to the teaching video page in response to a triggering operation by a user on the triggering control, where the teaching video page includes at least one teaching video and at least one target task corresponding to the teaching video.

According to one or more embodiments of the present disclosure, the teaching video page includes at least one teaching category, where each teaching category includes at least one teaching video;

the jumping to the teaching video page in response to the triggering operation by the user on the triggering control includes:

for each teaching category, determining a target presentation video corresponding to the teaching category, performing differentiated display on the target presentation video and displaying at least one target task corresponding to the target presentation video;

where the differentiated display includes any one of enlarged display and highlighted display.

According to one or more embodiments of the present disclosure, the determining the target presentation video corresponding to the teaching category includes:

determining a first teaching video from the at least one teaching video corresponding to the teaching category as the target presentation video; or, in response to a selection operation by the user on any teaching video in the at least one teaching video, determining the teaching video selected by the user as the target presentation video.

According to one or more embodiments of the present disclosure, after the jumping to the teaching video page in response to the triggering operation by the user on the triggering control, further including:

in response to a selection operation by the user on any teaching video in the at least one teaching video, determining a teaching video selected by the user as the target teaching video; and jumping to a playing page of the target teaching video, and displaying a task prompt popup window corresponding to the target teaching video in a preset display area on the playing page.

According to one or more embodiments of the present disclosure, after the displaying the task prompt popup window corresponding to the target teaching video in the preset display area on the playing page, further including:

in response to a triggering operation by the user on the task prompt popup window, displaying a detail page of at least one target task corresponding to the target teaching video on the playing page, where the detail page includes at least one target task corresponding to a currently played teaching video.

According to one or more embodiments of the present disclosure, after the displaying the task prompt popup window corresponding to the target teaching video in the preset display area on the playing page, further including:

when it is detected that a playing progress of the target teaching video reaches a preset progress threshold value, or a playing duration of the target teaching video reaches a preset duration threshold value, displaying a detail page of at least one target task corresponding to the target teaching video on the playing page, where the detail page includes at least one target task corresponding to a currently played teaching video.

According to one or more embodiments of the present disclosure, a preset area around each target task further includes a state identifier corresponding to the target task; and the method further includes:

for each target task, determining a playing progress of a target teaching video corresponding to the target task; and displaying, according to the playing progress, a state identifier corresponding to the playing progress in the preset area around each target task.

According to one or more embodiments of the present disclosure, the displaying, according to the playing progress, the state identifier corresponding to the playing progress in the preset area around each target task includes:

for each target task on the playing page, when it is detected that the playing progress of the target teaching video does not reach a preset progress threshold value, displaying a preset first state identifier; and when it is detected that the playing progress reaches the preset progress threshold value, switching the first state identifier to a preset second state identifier;

where the first state identifier is configured to be in a non-triggerable state, and the second state identifier is configured to be in a triggerable state.

According to one or more embodiments of the present disclosure, after the switching the first state identifier to the preset second state identifier, further including:

in response to a triggering operation by the user on the second state identifier corresponding to the target task on the playing page, jumping to a task processing interface corresponding to the target task; and performing, according to a completion state of the target task, a switching operation on the state identifier corresponding to the target task on the playing page.

According to one or more embodiments of the present disclosure, the performing, according to the completion state of the target task, the switching operation on the state identifier corresponding to the target task on the playing page includes:

when it is detected that a state of any target task on the playing page is a completed state, switching the state identifier corresponding to the target task to a preset third state identifier; where the third state identifier is used for indicating that the target task is completed.

According to one or more embodiments of the present disclosure, the displaying, according to the playing progress, the state identifier corresponding to the playing progress in the preset area around each target task includes:

for each target task on the teaching video page, when it is detected that the playing progress of the teaching video corresponding to the target task does not reach a preset progress threshold value, displaying a preset first state identifier; and when it is detected that the playing progress of the teaching video corresponding to the target task reaches the preset progress threshold value, switching the first state identifier to a preset second state identifier;

where the first state identifier is configured to be in a non-triggerable state, and the second state identifier is configured to be in a triggerable state.

According to one or more embodiments of the present disclosure, after the switching the first state identifier to the preset second state identifier, further including:

in response to a triggering operation by the user on the second state identifier corresponding to any target task on the teaching video page, jumping to a task processing interface corresponding to the target task; and performing, according to a completion state of the target task, a switching operation on the state identifier corresponding to the target task on the teaching video page.

According to one or more embodiments of the present disclosure, the performing, according to the completion state of the target task, the switching operation on the state identifier corresponding to the target task on the teaching video page includes:

when it is detected that a state of any target task on the teaching video page is a completed state, switching the state identifier corresponding to the target task to a preset third state identifier;

where the third state identifier is used for indicating that the target task is completed.

According to one or more embodiments of the present disclosure, the teaching video page further includes a task progress display area;

after the jumping to the teaching video page in response to the triggering operation by the user on the triggering control, the method further includes:

determining a completion progress of the at least one target task; and according to the completion progress, adjusting a task progress in the task progress display area, and displaying a progress icon corresponding to the task progress.

According to one or more embodiments of the present disclosure, the displaying the progress icon corresponding to the task progress includes:

when it is detected that a quantity of currently completed target progress does not match a preset task threshold value, displaying a preset first progress icon; and when it is detected that the quantity of currently completed target progress matches a preset task threshold value, switching the first progress icon into a preset second progress icon;

where the first progress icon is configured to be in a non-triggerable state, and the second progress icon is configured to be in a triggerable state.

According to one or more embodiments of the present disclosure, after the switching the first progress icon to the preset second preset progress icon, further including:

in response to a triggering operation by the user on the second progress icon, issuing, to an account of the user, a virtual resource matching the task progress.

In a second aspect, according to one or more embodiments of the present disclosure, provided is an apparatus for displaying a teaching video task, including:

a displaying module, configured to display a triggering control corresponding to a teaching video page on a display interface; and a processing module, configured to jump to the teaching video page in response to a triggering operation by a user on the triggering control, where the teaching video page includes at least one teaching video and at least one target task corresponding to the teaching video.

According to one or more embodiments of the present disclosure, the teaching video page includes at least one teaching category, where each teaching category includes at least one of the teaching video;

the processing module is configured to: determine, for each teaching category, a target presentation video corresponding to the teaching category, and perform differentiated display on the target presentation video and display at least one target task corresponding to the target presentation video;

where the differentiated display includes any one of enlarged display and highlighted display.

According to one or more embodiments of the present disclosure, the processing module is configured to:

determine a first teaching video from at least one teaching video corresponding to the teaching category as the target presentation video; or, in response to a selection operation by the user on any teaching video in the at least one teaching video, determine a teaching video selected by the user as the target presentation video.

According to one or more embodiments of the present disclosure, the apparatus further includes:

a determining module, configured to determine, in response to a selection operation by the user on any teaching video in the at least one teaching video, a teaching video selected by the user as the target teaching video; and a jumping module, configured to jump to a playing page of the target teaching video, and display a task prompt popup window corresponding to the target teaching video in a preset display area on the playing page.

According to one or more embodiments of the present disclosure, the apparatus further includes:

a displaying module, configured to display a detail page of at least one target task corresponding to the target teaching video on the playing page in response to a triggering operation by the user on the task prompt popup window, where the detail page includes at least one target task corresponding to a currently played teaching video.

According to one or more embodiments of the present disclosure, the apparatus further includes:

a displaying module, configured to: when it is detected that a playing progress of the target teaching video reaches a preset progress threshold value, or, when a playing duration of the target teaching video reaches a preset duration threshold value, display a detail page of at least one target task corresponding to the target teaching video on the playing page, where the detail page includes at least one target task corresponding to a currently played teaching video.

According to one or more embodiments of the present disclosure, a preset area around each target task further includes a state identifier corresponding to the target task; and the apparatus further includes:

a progress determining module, configured to: determine, for each target task, a playing progress of a target teaching video corresponding to the target task; and a displaying module, configured to: display a state identifier corresponding to the playing progress in the preset area around each target task according to the playing progress.

According to one or more embodiments of the present disclosure, the displaying module is configured to:

for each target task on the playing page, when it is detected that the playing progress of the target teaching video does not reach a preset progress threshold value, display a preset first state identifier; and when it is detected that the playing progress reaches the preset progress threshold value, switching the first state identifier to a preset second state identifier;

where the first state identifier is configured to be in a non-triggerable state, and the second state identifier is configured to be in a triggerable state.

According to one or more embodiments of the present disclosure, the displaying module is further configured to:

in response to a triggering operation by the user on a second state identifier corresponding to any target task on the playing page, jump to a task processing interface corresponding to the target task; and according to a completion state of the target task, perform a switching operation on the state identifier corresponding to the target task on the playing page.

According to one or more embodiments of the present disclosure, the displaying module is configured to: when it is detected that a state of any target task on the playing page is a completed state, switch the state identifier corresponding to the target task to a preset third state identifier; where the third state identifier is used for indicating that the target task is completed.

According to one or more embodiments of the present disclosure, the displaying module is configured to:

for each target task on the teaching video page, when it is detected that the playing progress of the teaching video corresponding to the target task does not reach a preset progress threshold value, display a preset first state identifier; and when it is detected that the playing progress of the teaching video corresponding to the target task reaches the preset progress threshold value, switching the first state identifier to a preset second state identifier;

where the first state identifier is configured to be in a non-triggerable state, and the second state identifier is configured to be in a triggerable state.

According to one or more embodiments of the present disclosure, the displaying module is further configured to:

in response to a triggering operation by the user on the second state identifier corresponding to any target task on the teaching video page, jump to a task processing interface corresponding to the target task; and according to a completion state of the target task, perform a switching operation on the state identifier corresponding to the target task in the teaching video page.

According to one or more embodiments of the present disclosure, the displaying module is configured to:

when it is detected that a state of any target task on the teaching video page is a completed state, switching the state identifier corresponding to the target task to a preset third state identifier;

where the third state identifier is used for indicating that the target task is completed.

According to one or more embodiments of the present disclosure, the teaching video page further includes a task progress display area; and the apparatus further includes:

a determining module, further configured to: determine a completion progress of the at least one target task; and an adjusting module, configured to adjust a task progress in the task progress display area according to the completion progress, and display a progress icon corresponding to the task progress.

According to one or more embodiments of the present disclosure, the adjusting module is configured to:

when it is detected that a quantity of currently completed target progress does not match a preset task threshold value, display a preset first progress icon; and when it is detected that the quantity of currently completed target progress matches the preset task threshold value, switching the first progress icon into a preset second progress icon;

where the first progress icon is configured to be in a non-triggerable state, and the second progress icon is configured to be in a triggerable state.

According to one or more embodiments of the present disclosure, the apparatus further includes:

an issuing module, configured to issue, in response to a triggering operation by the user on the second progress icon, to an account of the user, a virtual resource matching the task progress.

In a third aspect, according to one or more embodiments of the present disclosure, provided is an electronic device, including: at least one processor and a memory;

the memory stores computer executable instructions; and the at least one processor executes the computer executable instructions stored in the memory to cause the at least one processor to execute the method for displaying a teaching video task according to the first aspect and various possible designs of the first aspect.

In a fourth aspect, according to one or more embodiments of the present disclosure, a computer readable storage medium is provided. The computer readable storage medium stores computer executable instructions. When a processor executes the computer executable instructions, the method for displaying a teaching video task according to the first aspect and various possible designs of the first aspect is implemented.

In a fifth aspect, according to one or more embodiments of the present disclosure, provided is a computer program product, including: a computer program, and when the computer program is executed by a processor, the method for displaying a teaching video task according to the first aspect and various possible designs of the first aspect is implemented.

The foregoing description is merely illustrative of the preferred embodiments of the present disclosure and of the technical principles applied thereto. It should be appreciated by a person skilled in the art that, the disclosure scope of the present disclosure is not limited to the technical solutions formed by specific combinations of the described technical features, and meanwhile should also cover other technical solutions formed by any combination of the described technical features or equivalent features thereof without departing from the described disclosed concept, for example, technical solutions formed by substituting the above features and technical features having similar functions as disclosed in the present disclosure (but not limited thereto) for one another.

In addition, while operations are depicted in a particular order, it should not be interpreted as that the operations need to be performed in a particular order as shown or in a sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented separately or in any suitable sub-combination.

Although the subject matter has been described in language specific to structural features and/or method logical acts, it should be understood that, the subject matter defined in the appended claims is not necessarily limited to the specific features or acts described above. Rather, the specific features and acts described above are merely illustrative forms for implementing the claims.

What is claimed is:

1. A method for displaying a teaching video task, comprising:

displaying a triggering control corresponding to a teaching video page on a display interface;

jumping to the teaching video page in response to a triggering operation by a user on the triggering control, wherein the teaching video page comprises at least one teaching video and at least one target task corresponding to the teaching video, and a preset area around each target task further comprises a state identifier corresponding to the target task;

for each target task, determining a playing progress of a target teaching video corresponding to the target task; and displaying, according to the playing progress, a state identifier corresponding to the playing progress in the preset area around each target task;

wherein the displaying, according to the playing progress, the state identifier corresponding to the playing progress in the preset area around each target task comprises:

for each target task on a playing page, when it is detected that the playing progress of the target teaching video does not reach a preset progress threshold value, displaying a preset first state identifier; and when it is detected that the playing progress reaches the preset progress threshold value, switching the first state identifier to a preset second state identifier; and wherein the first state identifier is configured to be in a non-triggerable state, and the second state identifier is configured to be in a triggerable state.

2. The method according to claim 1, wherein the teaching video page comprises at least one teaching category, wherein each teaching category comprises at least one teaching video;

wherein the jumping to the teaching video page in response to the triggering operation by the user on the triggering control comprises:

for each teaching category, determining a target presentation video corresponding to the teaching category, performing differentiated display on the target presentation video and displaying at least one target task corresponding to the target presentation video; and wherein the differentiated display comprises any one of enlarged display and highlighted display.

3. The method according to claim 2, wherein the determining the target presentation video corresponding to the teaching category comprises:

determining a first teaching video from at least one teaching video corresponding to the teaching category as the target presentation video; or in response to a selection operation by the user on any teaching video in the at least one teaching video, determining a teaching video selected by the user as the target presentation video.

4. The method according to claim 1, after the jumping to the teaching video page in response to the triggering operation by the user on the triggering control, further comprising:

in response to a selection operation by the user on any teaching video in the at least one teaching video, determining a teaching video selected by the user as the target teaching video; and jumping to the playing page of the target teaching video, and displaying a task prompt popup window corresponding to the target teaching video in a preset display area on the playing page.

5. The method according to claim 4, after the displaying the task prompt popup window corresponding to the target teaching video in the preset display area on the playing page, further comprising:

in response to a triggering operation by the user on the task prompt popup window, displaying a detail page of at least one target task corresponding to the target teaching video on the playing page, wherein the detail page comprises at least one target task corresponding to a currently played teaching video.

6. The method according to claim 4, after the displaying the task prompt popup window corresponding to the target teaching video in the preset display area on the playing page, further comprising:

when it is detected that the playing progress of the target teaching video reaches the preset progress threshold value, or a playing duration of the target teaching video reaches a preset duration threshold value, displaying a detail page of at least one target task corresponding to the target teaching video on the playing page, wherein the detail page comprises at least one target task corresponding to a currently played teaching video.

7. The method according to claim 1, after the switching the first state identifier to the preset second state identifier, further comprising:

in response to a triggering operation by the user on the second state identifier corresponding to any target task on the playing page, jumping to a task processing interface corresponding to the target task; and performing, according to a completion state of the target task, a switching operation on the state identifier corresponding to the target task on the playing page.

8. The method according to claim 7, wherein the performing, according to the completion state of the target task, the switching operation on the state identifier corresponding to the target task on the playing page comprises:

when it is detected that a state of any target task on the playing page is a completed state, switching the state identifier corresponding to the target task to a preset third state identifier; and wherein the third state identifier is used for indicating that the target task is completed.

9. The method according to claim 1, wherein the displaying, according to the playing progress, the state identifier corresponding to the playing progress in the preset area around each target task further comprises:

for each target task on the teaching video page, when it is detected that the playing progress of the teaching video corresponding to the target task does not reach the preset progress threshold value, displaying the preset first state identifier; and when it is detected that the playing progress of the teaching video corresponding to the target task reaches the preset progress threshold value, switching the first state identifier to the preset second state identifier.

10. The method according to claim 9, after the switching the first state identifier to the preset second state identifier, further comprising:

in response to a triggering operation by the user on the second state identifier corresponding to any target task on the teaching video page, jumping to a task processing interface corresponding to the target task; and performing, according to a completion state of the target task, a switching operation on the state identifier corresponding to the target task on the teaching video page.

11. The method according to claim 9, wherein the performing, according to the completion state of the target task, the switching operation on the state identifier corresponding to the target task on the teaching video page comprises:

when it is detected that a state of any target task on the teaching video page is a completed state, switching the state identifier corresponding to the target task to a preset third state identifier; and wherein the third state identifier is used for indicating that the target task is completed.

12. The method according to claim 1, wherein the teaching video page further comprises a task progress display area; and wherein after the jumping to the teaching video page in response to the triggering operation by the user on the triggering control, the method further comprises:

determining a completion progress of the at least one target task; and adjusting a task progress in the task progress display area according to the completion progress, and displaying a progress icon corresponding to the task progress.

13. The method according to claim 12, wherein the displaying the progress icon corresponding to the task progress comprises:

when it is detected that a quantity of currently completed target progress does not match a preset task threshold value, displaying a preset first progress icon; and when it is detected that the quantity of currently completed target progress matches the preset task threshold value, switching the first progress icon into a preset second progress icon.

14. The method according to claim 13, after the switching the first progress icon to the preset second progress icon, further comprising:

in response to a triggering operation by the user on the second progress icon, issuing, to an account of the user, a virtual resource matching the task progress.

15. An apparatus for displaying a teaching video task, comprising:

a processor and a memory;

wherein the memory stores computer executable instructions; and wherein the processor executes the computer executable instructions stored in the memory, to cause the processor to:

display a triggering control corresponding to a teaching video page on a display interface; and jump to the teaching video page in response to a triggering operation by a user on the triggering control, wherein the teaching video page comprises at least one teaching video and at least one target task corresponding to the teaching video;

wherein a preset area around each target task further comprises a state identifier corresponding to the target task; and the processor is further caused to:

for each target task, determine a playing progress of a target teaching video corresponding to the target task;

for each target task on a playing page, when it is detected that the playing progress of the target teaching video does not reach a preset progress threshold value, display a preset first state identifier; and when it is detected that the playing progress reaches the preset progress threshold value, switch the first state identifier to a preset second state identifier; and wherein the first state identifier is configured to be in a non-triggerable state, and the second state identifier is configured to be in a triggerable state.

16. A non-transitory computer readable storage medium, wherein the computer readable storage medium stores computer executable instructions, and a processor executes the computer executable instructions to:

display a triggering control corresponding to a teaching video page on a display interface; and jump to the teaching video page in response to a triggering operation by a user on the triggering control, wherein the teaching video page comprises at least one teaching video and at least one target task corresponding to the teaching video;

wherein a preset area around each target task further comprises a state identifier corresponding to the target task; and the processor is further caused to:

for each target task, determine a playing progress of a target teaching video corresponding to the target task;

for each target task on a playing page, when it is detected that the playing progress of the target teaching video does not reach a preset progress threshold value, display a preset first state identifier; and when it is detected that the playing progress reaches the preset progress threshold value, switch the first state identifier to a preset second state identifier; and wherein the first state identifier is configured to be in a non-triggerable state, and the second state identifier is configured to be in a triggerable state.

* * * * *